United States Patent
Shamseldin et al.

(10) Patent No.: US 8,651,801 B2
(45) Date of Patent: Feb. 18, 2014

(54) SEAL MONITORING AND CONTROL SYSTEM

(75) Inventors: Elhanafi A. Shamseldin, Des Plaines, IL (US); Joe Delrahim, Deerfield, IL (US); Paul A. Hosking, Kildeer, IL (US); Joseph L. Savio, Des Plaines, IL (US); Vladimir Bakalchuk, Skokie, IL (US)

(73) Assignee: John Crane Inc., Morton Grove, IL (US)

(*) Notice: Subject to any disclaimer, the term of this patent is extended or adjusted under 35 U.S.C. 154(b) by 673 days.

(21) Appl. No.: 12/469,045

(22) Filed: May 20, 2009

(65) Prior Publication Data

US 2009/0290971 A1 Nov. 26, 2009

Related U.S. Application Data

(60) Provisional application No. 61/055,056, filed on May 21, 2008.

(51) Int. Cl.
*F01D 11/00* (2006.01)
*F16J 15/00* (2006.01)
*F01D 11/02* (2006.01)

(52) U.S. Cl.
USPC .................. 415/112; 415/174.5; 277/317

(58) Field of Classification Search
USPC ........... 415/111, 112, 173.5, 174.5, 230, 119, 415/30, 47; 277/317–320, 321
See application file for complete search history.

(56) References Cited

U.S. PATENT DOCUMENTS

| | | | |
|---|---|---|---|
| 3,508,758 A | 4/1970 | Strub | |
| 4,389,849 A | 6/1983 | Gasser et al. | |
| 4,613,285 A | 9/1986 | Sato et al. | |
| 4,643,437 A * | 2/1987 | Salant et al. | 277/319 |
| 4,691,276 A * | 9/1987 | Miller et al. | 700/47 |
| 5,063,993 A * | 11/1991 | Huston | 165/4 |
| 5,076,589 A | 12/1991 | Marsi | |
| 5,327,920 A * | 7/1994 | Gerard et al. | 134/57 R |
| 5,412,977 A | 5/1995 | Schmohl et al. | |
| 5,755,372 A | 5/1998 | Cimbura, Sr. | |
| 6,082,737 A | 7/2000 | Williamson et al. | |

(Continued)

FOREIGN PATENT DOCUMENTS

| | | |
|---|---|---|
| EP | 0 800 028 A1 | 8/1997 |
| JP | 5-164412 A | 6/1993 |

OTHER PUBLICATIONS

John Crane Lemco, The Seal Support Report, Jul. 12, 2002, 3 pages, vol. 1, Issue 3, John Crane Lemco, Tulsa, Oklahoma.

(Continued)

*Primary Examiner* — Nathaniel Wiehe
*Assistant Examiner* — Su Htay
(74) *Attorney, Agent, or Firm* — Leydig, Voit & Mayer Ltd

(57) ABSTRACT

A seal monitoring and control system for a gas lubricated non-contacting seal includes various sensors providing signals to a programmable logic control system. The control system is disposed to determine a presence of an anomalous operating condition of the seal, for example, based on phase, relative position of rotor to stator or other signals in combination provided by the various sensors to provide an output signal, which in one embodiment performs at least one mitigating process to correct the anomalous operating condition by adjusting at least one operating parameter of the seal.

19 Claims, 6 Drawing Sheets

(56) References Cited

U.S. PATENT DOCUMENTS

| | | |
|---|---|---|
| 6,345,954 B1 * | 2/2002 | Al-Himyary et al. ......... 415/112 |
| 6,575,621 B1 * | 6/2003 | Zlochin ........................... 374/28 |
| 6,626,436 B2 * | 9/2003 | Pecht et al. ................... 277/317 |
| 6,715,985 B2 * | 4/2004 | Delrahim et al. ............... 415/26 |
| 6,981,513 B2 | 1/2006 | Krywitsky |
| 7,025,559 B2 * | 4/2006 | Loy et al. ........................... 415/1 |
| 7,272,525 B2 | 9/2007 | Bennett et al. |
| 2006/0196057 A1 * | 9/2006 | So ................................... 30/322 |

OTHER PUBLICATIONS

PCT International Search Report, International Application No. PCT/US2009/044627, International Filing date May 20, 2009, 2 pages.

PCT Written Opinion of the International Searching Authority, International Application No. PCT/US2009/044627, International Filing date May 20, 2009, 7 pages.

European Patent Office, Extended European Search Report in European Patent application No. 09751441.8 (Apr. 2, 2012).

* cited by examiner

SEAL MONITORING AND CONTROL SYSTEM

CROSS-REFERENCE TO RELATED APPLICATIONS

This patent application claims the benefit of U.S. Provisional Patent Application No. 61/055,056, filed May 21, 2008, which is incorporated herein in its entirety by reference.

BACKGROUND

The disclosure relates to non-contacting, gas lubricated seals for rotating components, including but not limited to conditioning and control systems for such seals.

In typical applications, gas lubricated non-contacting seals are disposed to seal a rotating interface between a shaft and housing of a compressor operating to compress a gas. During operation, a portion of the flow of the gas being processed may be diverted from the operating flow and filtered to remove particulate and liquid mist that may be present in the operating flow. This diverted gas flow may be further processed, for example, superheated to a temperature above its dew point, and provided to gas lubricated non-contacting seals as an operating fluid.

Upsets in the compression process, such as improper gas conditioning, or a change in the composition of the operating flow of gas, may cause liquid and/or solid condensates into the diverted gas flow. Such intrusion of liquids and/or solids into a seal interface of the gas lubricated non-contacting seals can lead to reduction of operating life of the seal or, under extreme conditions, failure of the seal.

Non-contacting dry gas seals commonly applied to gas compressors include a seal arrangement (single, tandem, or double), gas conditioning equipment, which is often arranged in modular form, and gas supply controls, which are typically arranged in a control panel. Such combinations are employed for both overhung and beam compressors. Monitoring of seal integrity and operation is typically accomplished by monitoring seal leakage. One can appreciate that a high rate of leakage is used as an indication that the seal has failed, which in the majority of cases is determined after disintegration of the sealing faces requiring an urgent shutting down of the compressor.

Moreover, one requirement for installation of dry gas seals is the ability to accommodate axial movement of the compressor shaft relative to the compressor housing during operation. A typical operating displacement tolerance specification is built into the seal during the design stage. Typically, seal installation plates position the seal at the nominal or optimum position within the compressor housing. The nominal position of an installed seal may be defined by a dimension locating the relationship between the rotating and stationery components that carry the seal components, which is sometimes referred to as the "installation reference" of a seal.

The installation reference dimension is typically measured between a surface that axially determines and secures the axial position of the seal rotor and the seal stator during operation, for example, thrust rings associated with the housing and shaft. Tolerance of axial motion of the seal during operation is needed to accommodate changes in the relative positioning between the rotating and stationary components of the compressor, which the seal components track. Several factors can cause changes in the relative position of a seal, such as the "as-built" condition of the equipment and thermal transients.

The "as-built" condition of a seal is a specific stack-up of tolerances for a given seal arrangement. To address the "as-built" condition, a seal supplier may provide an initial installed tolerance for the seal as installed. Accounting for this condition, a seal may be installed at a "0" position, which still leaves the full range of the resulting displacement tolerance to accommodate movement within the compressor during operation, the most significant of which typically being thermal transients. As is known, thermal transients can change the relative position of a seal because the compressor rotor may expand or contract at a different rate than the compressor stator or casing due to changes in the temperature of the process fluid, which may result in a dimensional relationship change between the rotor and stator seal components.

BRIEF SUMMARY OF THE DISCLOSURE

The disclosure describes, in one aspect, a seal monitoring system for a gas lubricated non-contacting seal disposed in sealing relationship between a rotatable shaft and a housing of a compressor. The seal monitoring system includes a phase sensor disposed to provide a phase signal indicative of non-gaseous matter being present adjacent to the gas lubricated non-contacting seal. A programmable logic control system is disposed to receive the phase signal and determine an operating condition of the gas lubricated non-contacting seal based on the phase signal. The programmable logic controller is further disposed to provide an output signal in response to the operating condition.

In another aspect, the disclosure describes a supply system for providing a flow of treated gas to a gas lubricated non-contacting seal disposed within a compressor. The supply system includes a control system and three pluralities of sensors. A first plurality of sensors measures seal operating parameters and provides a first plurality of signals indicative of the seal operating parameters to the control system. A second plurality of sensors measures supply system operating parameters relative to the flow of treated gas, and provides a second plurality of signals to the control system. A third plurality of sensors measures compressor operating parameters and provides a third plurality of signals indicative of the compressor operating parameters to the control system. The control system determines an operating condition of the gas lubricated non-contacting seal based on the first, second, and third pluralities of signals, and provides an output in response to the operating condition.

In yet another aspect, the disclosure describes a method of monitoring and controlling operation of a seal associated with a supply system supplying a flow of process gas to the seal. The method includes acquiring a plurality of sensor signals provided by a plurality of sensors associated with the seal and the supply system. The plurality of sensor signals is processed to determine presence of an anomalous operating condition of said seal. A mitigation procedure that adjusts at least one operating parameter of said seal is initiated and conducted while the anomalous operating condition is present and while each sensor signal is below a corresponding threshold.

In yet another aspect, the disclosure describes a seal monitoring system for a gas lubricated non-contacting seal disposed in sealing relationship between a rotatable shaft and a housing of a compressor. The seal monitoring system includes a position sensor providing a position signal indicative of the relative axial position of rotatable components and stationary components of the gas lubricated non-contacting seal. A programmable logic control system receives the position signal and determines an operating condition of the gas lubricated non-contacting seal based on the position signal. The programmable logic controller further provides an output signal in response to the operating condition.

DETAILED DESCRIPTION

Non-contacting dry gas seals, such as those commonly applied to gas compressors, include a single, tandem, or double seal arrangements. In a typical installation, gas conditioning equipment is often arranged in modular form, and gas supply controls are typically arranged in a gas control panel. Such combinations are employed for both overhung and beam compressors. While one combination that includes a tandem non-contacting dry gas seal for a compressor that is part of an installation having gas conditioning equipment and gas supply controls arranged in a control panel is used in the description of the embodiments that follow, but one can appreciate that the principles and methods disclosed herein are applicable to other structural combinations, and/or seal configurations. As is well known, the associated gas control panel is arranged and piped into the system to control treated seal gas supplied from the process source. It also receives gas from the leakage ports. Appropriate flow monitoring meters are incorporated into the system at the control panel.

Figure 1:
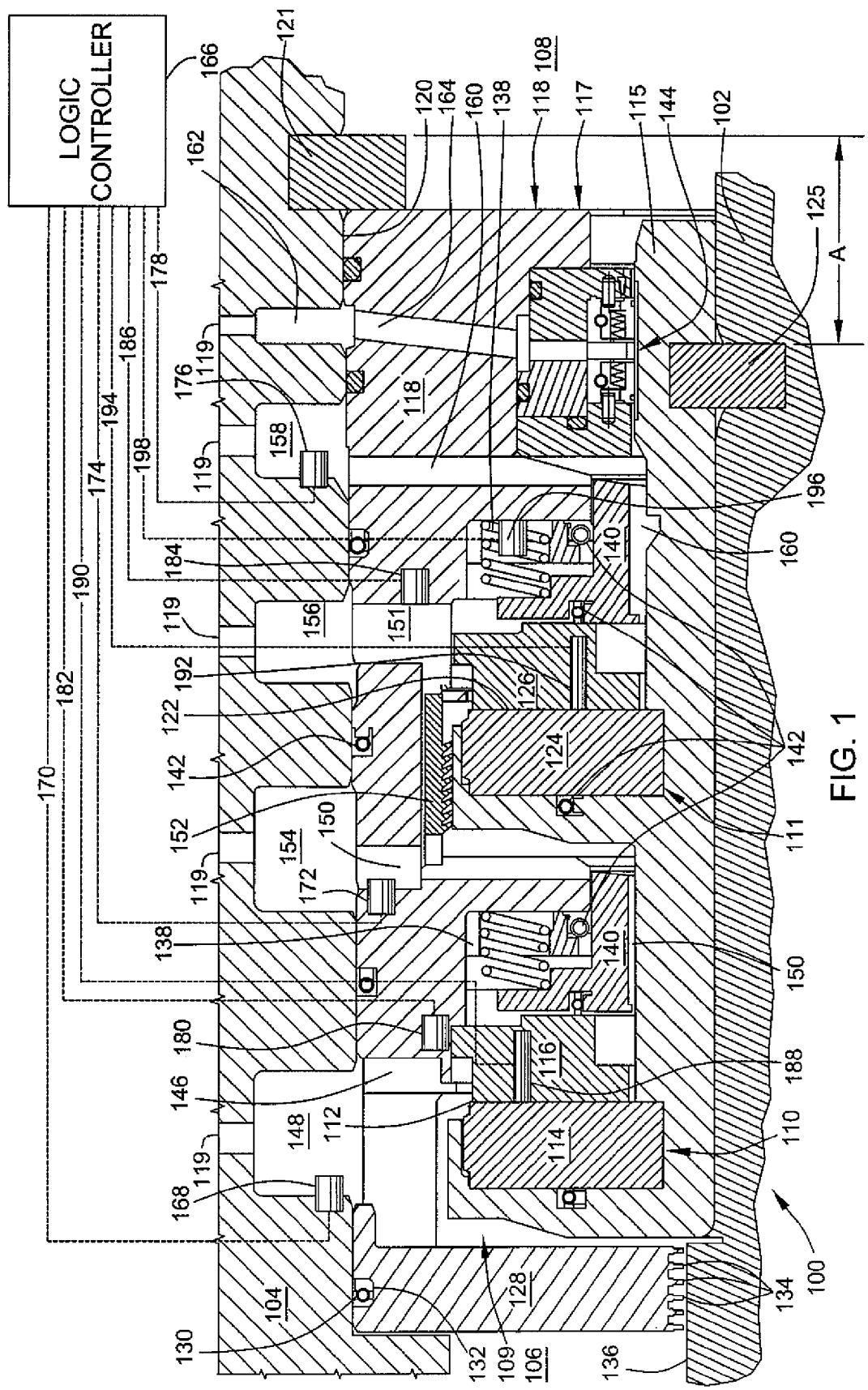
FIG. 1 is a cross section of a tandem seal arrangement having various sensors embedded therein in accordance with the disclosure.

FIG. 1 is a partial cross section of a tandem non-contacting dry gas seal arrangement 100 disposed between a rotating compressor shaft 102 and a compressor housing 104. In the view illustrated, the rotating compressor shaft 102 is connected to a compressor impeller (not shown) disposed in a process cavity 106 of the compressor, and is supported by the housing 104 via a bearing (not shown) disposed in a bearing cavity 108 of the housing 104. A bore 120 formed in the compressor housing 104 extends between process cavity 106 and bearing cavity 108 and defines an annular seal chamber 109. A shroud or labyrinth seal 128 prevents the free flow of gas from the process cavity 106 into the bore 120. The labyrinth seal 128 extends over a radially extending opening formed between the rotating compressor shaft 102 and the compressor housing 104, to which the labyrinth seal 128 is sealed by way of a radial compression seal 130 disposed in a channel 132 formed in the labyrinth seal 128. At its radially inner end, the labyrinth seal 128 forms a plurality of ridges 134 in close proximity to an outer surface 136 of the rotating compressor shaft 102. The plurality of ridges 134 and the corresponding intermediate cavities formed between any two consecutive ridges 134 impede the ingress of gas from the process cavity 106 into the seal chamber 109.

During operation, gas present in the process cavity 106, which can reach pressures of 6,500 PSI-G (450 BAR-G), is sealed from the bearing cavity 108 and from the environment by two face seals, a first stage seal 110 and a second stage seal 111, arranged in tandem. Typically the components of seals 110 and 111 are preassembled into a cartridge 118 which resides in the seal chamber 109. The cartridge 118 includes a stator 117 associated with compressor housing 104 and a sleeve 115 associated with shaft 102. Axial movement of the sleeve 115 relative to the shaft 102 is limited by a shaft thrust ring 125 received in a groove in the shaft 102. Axial movement of the stator 117 is limited by stator thrust ring 121 received in a groove in housing 104. Assuming that the process gas in process cavity 106 is under pressure, all components of the seal arrangement 100 are urged in the direction toward thrust rings 121 and 125.

The first stage seal 110 forms a first stage seal interface 112 defined between a first stage mating ring 114 connected to sleeve 115 disposed around the rotating compressor shaft 102, and a first stage primary ring 116 connected to the compressor housing 104 by stator 117. The second stage seal 111 forms a second stage seal interface 122 defined between a second stage mating ring 124 connected to the rotating compressor shaft 102 by sleeve 115 and a second stage primary ring 126 connected to the housing 104 by stator 117.

Each of the first and second stage primary rings 116 and 126 is axially movable along a major dimension of the bore 120 such that a controlled distance may be maintained along each of the first and second stage seals 110 and 111. In the illustrated embodiment, a spring force is applied to each primary ring 116 and 126 via a respective set of springs 138 disposed between the seal cartridge 118 and a spring carrier 140 in contact with and corresponding to each of the first and second stage primary rings 116 and 126.

As illustrated in FIG. 1, secondary leak paths for gases through the first and second stage seals 110 and 111 are blocked by radial compression seals 142. The arrangement and materials used for these seals can be optimized based on the application, for example, the operating pressures of the gas, as well as the chemical composition of the gas and/or the operating environment of the compressor. The radial seals may include O-rings, other composite seal arrangements, such as advanced polymer seals surrounding seal carrier members, or any other appropriate type of seal.

Lubrication oil present in the bearing cavity 108 is prevented from entering the seal chamber 109 of bore 120 by an oil seal, for example, a separation seal 144. In the illustrated embodiment, the barrier seal 144 is a dual-segmented carbon ring seal designed to prevent the migration of bearing oil to the dry gas seal cartridge on turbo-compressor equipment, such as a "Type 82" or a "Type 83" seal manufactured by John Crane, Inc. of Morton Grove, Ill.

As discussed above, during operation, a flow of treated process gas referred to as "sealing gas" is provided to the first stage seal 110. A flow of barrier gas, typically an inert gas such as nitrogen ($N_2$), is provided to the second stage seal 111. In the illustrated embodiment, which includes separation seal 144, a flow of separation gas is supplied to the separation seal 144. Properly controlled flow of the sealing gas, barrier gas and separation gas through the seal elements is essential to effective seal performance and durability.

As illustrated in FIG. 1, the labyrinth seal 128, first and second stage seals 110 and 11, and separation seal 144, divide the seal cartridge 118 into a series of chambers 146, 150, 151, 160 and 164. The compressor housing 104 similarly defines a series of annular passages 148, 154, 156, 158 and 162 in communication with the chambers and passages in the stator 117 of cartridge 118. The passages 148, 154, 156, 158 and 162, in turn, are connected through ports 119 to piping, external to the compressor housing 104, to various sources of gas or discharge conduits as described below. Typically, this piping connects through the gas control panel associated with the compressor seal arrangement 100. The gas control panel houses control valves and monitoring gauges all as is well known an commercially available.

Chamber and passage 146 and 148 define a sealing gas inlet and receive "sealing gas" which is treated process gas usually at a pressure at or above the process gas in the process cavity 106. This supply is treated and controlled to ensure that moisture is removed and that it is at the desired pressure and temperature. The sealing gas in chamber 146 blocks ingress of untreated process gas from process cavity 106 across labyrinth seal 108.

Chamber and passage 151 and 156 define a barrier gas inlet and receive a barrier gas input, usually nitrogen. The barrier gas is at a pressure slightly higher than the pressure of the gases in chamber and passage 150 and 154. These latter passages define the sealing gas and barrier gas outlet, sometimes referred to as primary leakage, usually directed to a flare for consumption of the sealing gas that passes across the first stage seal interface 112 and dissipation of the barrier gas that passes across labyrinth seal 152 from chamber and passage 151 and 156.

The barrier gas in chamber and passage 151 and 156 also passes across second stage seal interface 122 into chamber and passage 160 and 158. That gas, mostly nitrogen, exists the seal arrangement 100 as "secondary leakage" through secondary leakage outlet defined by chamber and passage 160 and 158.

A separation gas supply is delivered to the chamber and passage 164 and 162 from an external source. It is usually nitrogen maintained at a pressure to isolate the seal chamber 109 from oil within bearing chamber 108. Some of this gas passes into the secondary leakage outlet at chamber and passage 160 and 158 across the separation seal 144.

During operation of the tandem non-contacting dry gas seal arrangement 100, filtered and treated process gas diverted from the process cavity 106 is provided to the sealing gas inlet passage 148 at a pressure that is at least equal or, preferably, slightly higher than the pressure of process gas in the process cavity 106. The diverted process gas may be filtered and treated in gas conditioning equipment (not shown) that preconditions the process gas delivered to the sealing gas inlet passage 148. Such gas may be heated and/or dried to remove vapor particulates and liquids, and in certain instances its pressure may be enhanced.

A flow of filtered and treated process gas (sealing gas) from the sealing gas inlet passage 148 enters the first chamber 146, from where it is provided to the labyrinth seal 128 and the first stage seal 110. Due to the pressure differentials present, a portion of the flow of filtered and treated process gas may leak into the process cavity 106 past the labyrinth seal 128, thus creating gas flow in a direction that prevents unfiltered and untreated process gas from entering the first chamber 146. A remaining portion of the flow of filtered and treated process gas (sealing gas) leaks past the first stage seal 110, via a gap that may be present along the first stage seal interface 112, and enters the second chamber 150 and passage 154 defining the sealing gas and barrier gas outlet.

During operation, a flow of barrier gas is provided to the barrier gas inlet passage 156 and chamber 151 at a pressure that is sufficiently high to ensure flow of barrier gas from the barrier gas inlet passage 156 and chamber 151 through the secondary labyrinth seal 152 into chamber 150 where it mixes with the portion of sealing gas that leaks through the first stage seal 110. The resulting mixture is removed from the seal cartridge 118 via the sealing gas and barrier gas outlet passage 154.

A portion of the barrier gas flow leaks past the second stage seal 111, via a gap along the second stage seal interface 122, and enters the secondary leakage outlet chamber 160 and passage 158.

Barrier gas present in the chamber 160 may mix with separation gas supplied to the separation gas supply passage 162 that leaks into the secondary leakage outlet chamber 160 past the separation seal 144. The resulting mixture of barrier gas and separation gas in the passage 160 is removed from the seal cartridge 118 via the second stage leakage and separation gas outlet passage 158. As can be appreciated, a portion of the flow of separation gas from the fourth passage 164 may leak into the bearing cavity 108, thus establishing a flow direction preventing oil from the bearing cavity 108 from entering into the seal cartridge 118.

In accordance with the embodiment of FIG. 1, a variety of sensors is associated with various portions of the tandem non-contacting dry gas seal arrangement 100, and the sensors are disposed to measure various operating parameters of the first stage seal 110, second stage seal 111, and separation seal 144. Such measurements are used to monitor and diagnose seal integrity and operation, as well as provide early warning for indications of anomalous seal operating conditions that may lead to failure or damage of seal components. More specifically, the various sensors employed are sensors providing signals to a logic controller 166 that is part of a seal monitoring and control system. Such signals may be indicative of physical parameters of the gases passing through the seal cartridge 118, such as the phase of such gases, and may also be indicative of physical parameters relating to the various components of the seals, such as the temperature or position of seal components within the seal cartridge 118. One embodiment of a set of sensors associated with the seal cartridge 118 in the illustrated embodiment is described in further detail below.

As shown in FIG. 1, a first stage phase sensor 168 is disposed to provide a first phase signal 170 to the logic controller 166. The first phase signal 170 is indicative of the presence of liquids or solids in the flow of filtered and treated process gas provided to the seal cartridge 118 via the sealing gas inlet passage 148. As shown schematically in FIG. 1, the first phase signal 170 is provided to the logic controller 166 via a communication line, which is shown in dashed line. In one embodiment, the first stage phase sensor 168 may be a conductivity sensor, inductive sensor, or similar device, and may provide information in the form of discrete, or continuous data, which indicates the presence or absence of any phase of matter other than a gaseous phase. In the illustrated embodiment, the first stage phase sensor 168 is an optical sensor, for example, which can detect the presence of solid or liquid aerosol solutions in a gas stream based on properties of a light beam emitted and received by the sensor.

In a similar fashion, a second stage phase sensor 172 is disposed to provide a second phase signal 174 based on the state of matter in the first stage or sealing gas leakage and barrier gas outlet passage 154, and a separation-stage phase sensor 176 is disposed to provide a third phase signal 178 that is indicative of the presence of a liquid, typically oil from the bearing cavity 108, in the second leakage and separation gas outlet passage 158. As with the first phase signal 170, each of the second and third phase signals 174 and 178 is provided to the logic controller 166 via appropriate communication lines in the form of a discrete value (e.g., a value of 0 indicating a gaseous phase, and a value of 1 indicating the presence of a liquid or solid phase) or another type of value.

Though illustrated as incorporated in the passages defined by the seal assembly stator 117 or the compressor housing 104, it is contemplated that the sensors 168, 172, and 176 could be located in any suitable location where phase recognition would be accomplished. These sensors could, for example, be located in the piping to the associated control panel or within conduits of the control panel itself.

In addition to sensors providing information on the phase of the working fluids within the seal cartridge 118, other sensors are illustrated in the embodiment of FIG. 1 that provide information about the operating conditions of various seal components. More specifically, a first stage primary ring temperature sensor 180 is disposed in the seal cartridge 118 and arranged to sense a temperature of the first stage primary ring 116. The first stage primary ring temperature sensor 180 is disposed to provide a first stage seal temperature signal 182 to the logic controller 166 via an appropriate communication line. In one embodiment, the first stage seal temperature signal 182 is an analog signal that provides instantaneous temperature readings to the logic controller 166 in a continuous data stream. The first stage primary ring temperature sensor 180 may be any appropriate type of sensor, including a resistive temperature device (RTD), thermocouple, or others.

In a similar fashion, a second stage primary ring temperature sensor 184 is disposed in the seal cartridge 118 and arranged to sense a temperature of the second stage primary ring 126 and provide a second stage temperature signal 186 to the logic controller 166. As with the first stage primary ring temperature sensor 180, the second stage primary ring temperature sensor 184 is an analog signal that provides instantaneous temperature readings to the logic controller 166 in a continuous data stream, and may include a RTD or thermocouple. Even though the two sensors 180 and 184 are shown associated with the primary rings 116 and 126 of, respectively, the first stage seal 110 and the second stage seal 111, such sensors may be associated with the corresponding mating rings 114 and 124 of the first and second stage seals 110 and 111 or, alternatively, any other component associated with each seal and having a temperature that can be correlated to the temperature of either the first stage and/or secondary rings of the first and second stage seals 110 and 111.

The distance or gap along the first and second stage seal interfaces 112 and 122 is not only important during service, but is also important as an indication of a structural fault in a seal even when the associated component is not operative. For example, in the absence of gas pressure at the seals, the presence of a gap along the first and second stage seal interfaces 112 and 122 may be an indication that the primary ring is not aligned with the corresponding mating ring of the seal. Accordingly, information on the position of each primary ring in a tandem seal arrangement, as illustrated in FIG. 1 or, in general, information about the gap along the first and second stage seal interfaces 112 and 122 becomes relevant to an early diagnosis of a seal failure.

In the illustrated embodiment, a first stage primary ring position or a first stage seal gap sensor 188 is mounted to the first stage primary ring 116 and disposed to measure the gap along the first stage seal interface 112 or, alternatively, measure a position of the first stage seal primary ring 116 relative to the first stage mating ring 114 as an indication of the gap along the first stage seal interface 112. The gap sensor 188 may provide a first stage seat gap signal 190 to the logic controller 166. The first stage seal gap signal 190 is indicative of the distance or gap present along the first stage seal interface 112 in real time and both during operation of the compressor as well as during times when the compressor is not operating and there is no working gas provided to the first stage seal 110.

A second stage primary ring position or second stage seal gap sensor 192 is disposed to measure the gap along the second stage seal interface 122. The second stage seal gap sensor 192 is disposed to provide a second stage seal gap signal 194 to the logic controller 166 that is indicative of the instantaneous distance or gap separating the second stage primary ring 126 from the second stage mating ring 124. Each of the first stage seal gap sensor 188 and the second stage seal gap sensor 192 may be any appropriate type of proximity sensor, for example, a conductivity sensor, an inductive or variable reluctance sensor, or others.

In the embodiment of FIG. 1, position sensor 196 is installed in the seal cartridge 118 and disposed to measure a distance indicative of the position of rotating components of the compressor relative to the position of the stator components. That directive is denoted as "A" in FIG. 1. As can be appreciated, stationary components of the compressor comprise the compressor housing 104, the stator 117 of seal cartridge 118, the first and second stage primary rings 116 and 126, the seal thrust ring 121, and associated non-rotating elements. The rotating components comprise the compressor shaft 102, sleeve 115, shaft thrust ring 125, first and second stage mating rings 114 and 124, and associated rotating elements.

The position sensor 196 is disposed to provide a position signal 198 to the logic controller 166. The position signal 198 indicates the axial distance, or change in axial distance during operation, of the rotating components of the compressor and seal relative to the stator component. In other words, the position signal 198 may be used to track the axial movement of the rotating components of the seal and compressor relative to the stationary components. Moreover, the position sensor 196 may be used during installation of the seal to confirm the relevant "as-built" and/or "as installed" positions of the seal cartridge 118, as well as monitor changes in their position during operation of the compressor. When monitoring such parameters, the position signal can be used provide an output, for example, to trigger an alert, when the initial "as-built" and/or "as-installed" displacement exceeds a maximum allowable installation tolerance or when the total displacement approaches a total maximum allowable operational tolerance.

Figure 2:
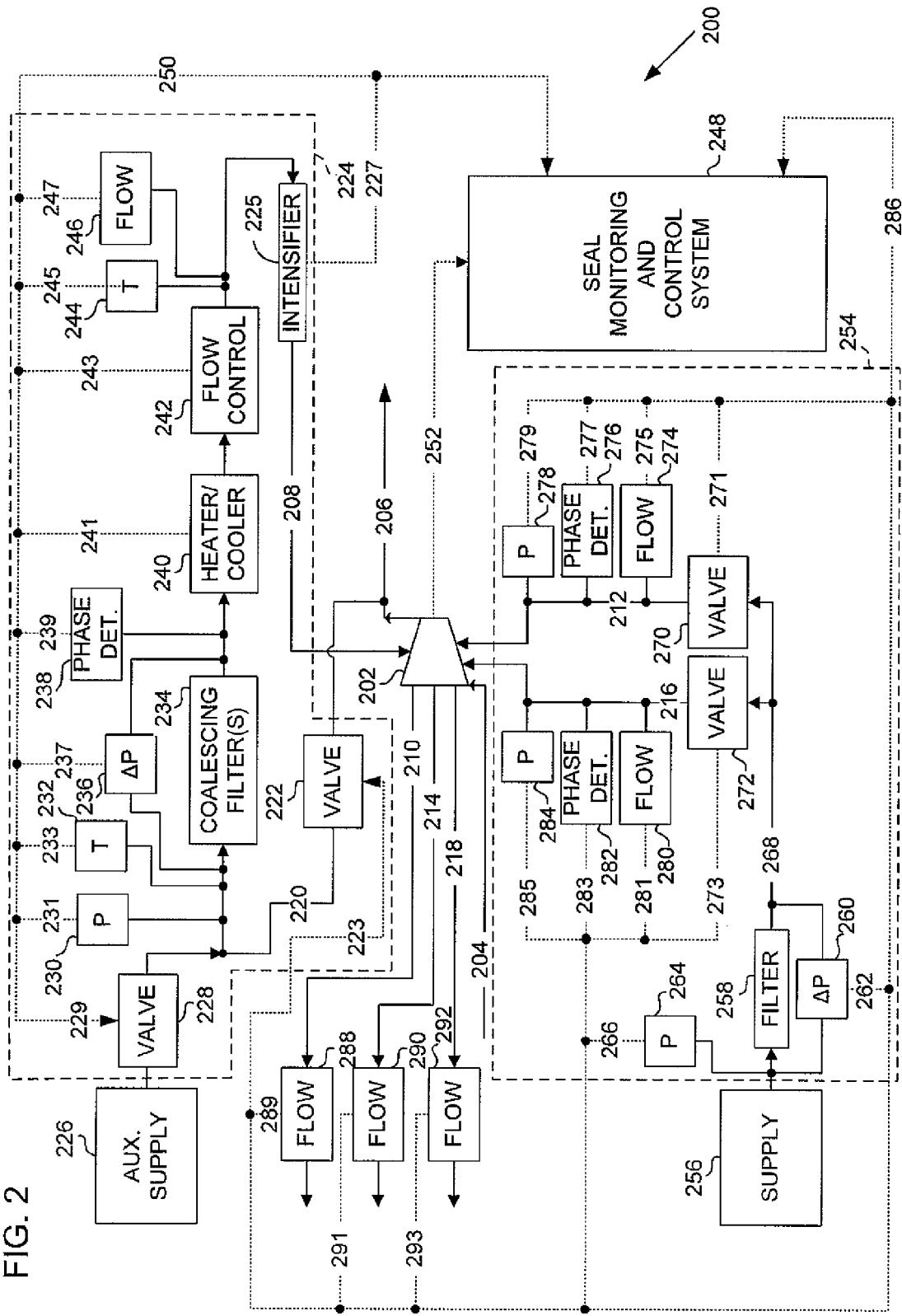
FIG. 2 is a block diagram of a supply system associated with a compressor in accordance with the disclosure.

A simplified schematic of a supply and treatment system 200 for providing filtered and treated sealing gas to non-contacting dry gas seals is shown in FIG. 2. In the illustrated embodiment, the supply and treatment system 200 is associated with a compressor 202 having at least one assembly comprising two non-contacting dry gas seals arranged in tandem, for example, the first stage seal 110 and the second stage seal 111 (as shown in FIG. 1), as well as a separation seal, for example, the separation seal 144 (FIG. 1). The compressor 202 operates to compress a flow of process gas that is provided to the compressor 202 via a process gas inlet passage 204. Compressed gas exits compressor 202 at a compressed process gas discharge conduit 206.

The housing of compressor 202 includes various inlets and outlet ports, associated with a dry gas seal assembly operating within the compressor 202 as previously described relative to FIG. 1. More specifically, and in reference to FIG. 1 and FIG. 2, the compressor 202 includes a sealing gas or process gas inlet conduit 208 fluidly connected to the sealing gas inlet passage 148, and a sealing gas and barrier gas outlet conduit 210 fluidly connected to the sealing gas and barrier gas outlet passage 154. The compressor further includes a barrier gas inlet conduit 212 fluidly connected to the barrier gas inlet passage 156, and a barrier gas and separation gas outlet conduit 214 fluidly connected to the secondary leakage or barrier gas and separation gas outlet passage 158. The compressor 202 also includes a separation gas inlet conduit 216 fluidly connected to the separation gas supply passage 162 and may include an optional separation gas outlet conduit 218 fluidly connected to the bearing cavity 108 of the compressor 202 and arranged to vent separation gas leaking past the barrier seal 144 into the bearing cavity 108.

Figure 3:
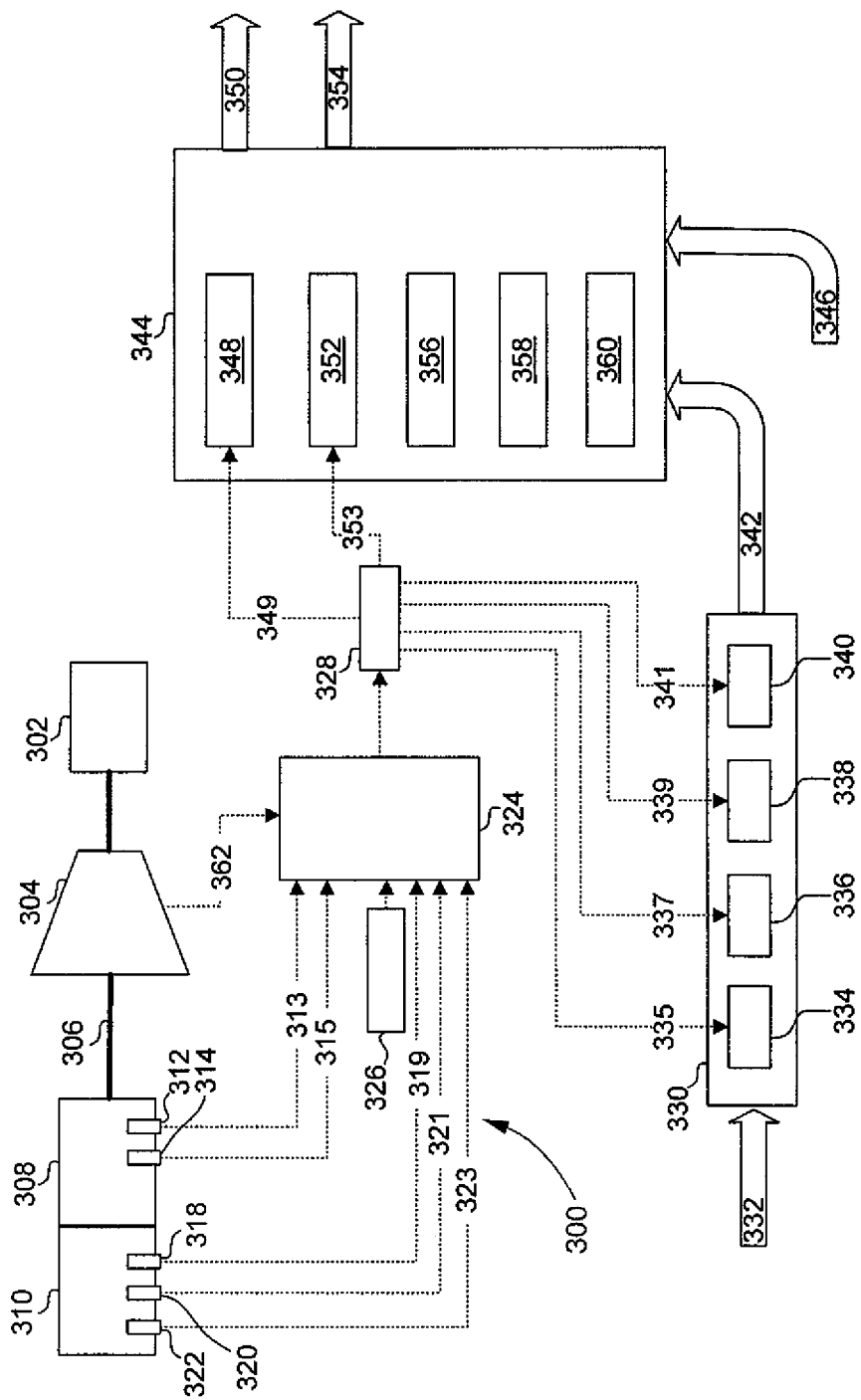
FIG. 3 is a block diagram of an embodiment of a programmable logic controller having interconnections to various components and systems of a seal arrangement associated with a beam compressor in accordance with the disclosure.

As described, the various inlet and outlet conduits connected to the housing of the compressor 202 define flow circuits for gas essential to operation of the dry gas seals in the compressor 202. As can be appreciated, the illustrated embodiment is provided consistent with the embodiment of a dry gas tandem seal arrangement as shown in FIG. 1, which means that other seal arrangements may have more or fewer inlet and outlet conduits formed in the compressor as appropriate to supply gas to dry gas seals operating therein. It should also be noted that the depiction of the location of the various sensors described with reference to FIGS. 1 and 3 is for illustrative purposes. The described sensors may be disposed in alternative locations within the fluid circuitry providing for flow of seal gases to and from a seal arrangement without departing from the invention. Moreover, it is contemplated that any given dry gas seal installation may include all, or less than all, of the specific sensors and parameter monitoring components illustrated herein. These descriptions are merely illustrative of available options.

In reference now to FIG. 2, the process gas supplied to the sealing gas or process gas inlet conduit 208 is, in one embodiment, process gas diverted from the compressed process gas conduit 206. As shown in FIG. 2, a process gas supply branch 220 extends from the compressed process gas conduit 206 and includes a process gas control valve 222 that meters the flow of compressed process entering a process gas treatment module 224 in response to a valve control signal 223. The process gas treatment module 224, which is shown surrounded by dashed lines, is arranged to filter and adjust the physical properties of process gas supplied to operate the first stage seal of the compressor 202, as well as adjust the pressure of the sealing gas. More specifically, the process gas treatment module 224 includes an intensifier 225 operating to adjust the pressure of process gas in response to a process gas pressure adjustment signal 227, and an auxiliary process gas supply reservoir 226 that can store process gas under pressure Gas from the auxiliary process gas supply reservoir may be used to augment the flow of process gas provided to the sealing gas inlet conduit 208 by selective activation of an auxiliary process gas control valve 228 in response to an auxiliary valve control signal 229.

The physical properties of process gas entering the process gas treatment module 224 are measured by a pressure sensor 230, which is disposed to provide a pressure signal 231 of process gas pressure entering the treatment module 224, and a temperature sensor 232, which is disposed to provide a temperature signal 233 indicative of the temperature of process gas entering the treatment module 224.

In a first process, liquid or solid constituents of the process gas flow entering the treatment module are removed, for example, by passing the flow through one or more coalescing filters 234. One example of an installation using coalescing filters is shown and described in U.S. Pat. No. 6,715,985, titled "Gas Conditioning System," which was granted on Apr. 6, 2004, is assigned on its face to John Crane Inc. of Morton Grove, Ill., (hereafter, the '985 patent), and which is incorporated herein in its entirety by reference. A delta-P sensor 236 is disposed to measure a pressure difference across the coalescing filters 234 and provide a pressure difference signal 237 indicative of the extent of filter saturation.

A phase sensor 238 is disposed to sense the presence of solids and/or liquids in the flow of process gas exiting the coalescing filters 234, and provide a process gas phase signal 239 indicating the presence of a phase of matter in the flow of process gas that is not gaseous. In one embodiment, the phase sensor 238 may be a conductivity sensor, inductive sensor, or similar device, and may provide the phase signal 239 in the form of discrete data, for example, a value of 0 when gas is sensed and a value of 1 when a solid or liquid matter phase is detected.

The treatment module 224 further includes a process gas heater/cooler 240 disposed to selectively change the temperature of the flow of process gas passing through the treatment module 224 in response to a temperature change command signal 241. During operation, the process gas heater/cooler 240 may adjust the temperature of the process gas under various conditions, for example, to cool the gas at times of elevated seal temperature within the compressor, or to heat the gas at times when liquids requiring evaporation are sensed in the process gas.

A flow control device 242 is disposed to control the rate of flow of process gas supplied to dry gas seals of a compressor. The flow control device 242 may be a simple valve or may alternatively be a device providing a fine control of a gas flow passing therethrough, such as a device that regulates the volume of gas delivered therethrough by maintaining a constant pressure differential across a metering orifice. Regardless of its configuration, the flow control device 242 can be any device capable of providing a controlled flow of process gas in response to a flow control signal 243.

In the illustrated embodiment, an additional temperature sensor 244 providing a sealing gas temperature 245, and a flow sensor 246 providing a sealing gas flow rate 247, are disposed downstream of the flow control device 242 within the treatment module 224. The sealing gas temperature 245 and sealing gas flow rate 247 are indicative of the temperature and flow rate of process gas entering the seal arrangement of compressor 202 during operation.

The various sensor and command signals associated with the treatment module 224 are exchanged between the various sensors and actuators of the treatment module and a seal monitoring and control system via a treatment module communication line 250, which is shown as a single dotted line but which is intended to include any appropriate number of communication lines or communication channels enabling the exchange of information and command signals between a controller included within the seal monitoring and control system 248, for example, the logic controller 166 shown in FIG. 1, and the various sensors and control devices included within the treatment module 224.

In the embodiment illustrated, a compressor communication line 252 is disposed to provide a channel of communication between various sensors associated with compressor components, such as the sensors shown and described relative to FIG. 1. The compressor communication line 252 is capable of providing various channels or of communication that provide information from each of the sensors associated with the compressor 202 to the seal monitoring and control system 248. In one embodiment, the compressor communication line 252 may be further associated with a plurality of sensors associated with the compressor and disposed to measure operating parameters thereof, such as compressor speed, suction pressure, discharge pressure, vibration, and so forth. Such additional parameters may be provided to the seal monitoring and control system 248 via the compressor communication line 252.

The gas supply and treatment system 200 further includes a barrier gas and separation gas supply system 254, which is shown surrounded by dashed lines in FIG. 2. In one embodiment, a single type of gas may be provided as a separation gas to a second stage dry gas seal and to a separation seal, for example, nitrogen, but different gases may also be used. In the illustrated embodiment, gas is provided to the barrier gas and separation gas supply system 254 from a storage tank 256. The gas from the storage tank 256 may be treated by a filter 258. Operation of the filter 258 may be monitored by measurement of a pressure difference across the filter 258 by a delta-P sensor 260 providing a pressure difference signal 262. The pressure of gas in the storage tank 256 may be measured by a pressure sensor 264 providing a storage pressure signal 266.

A flow of filtered gas exiting the filter 258 passes through a conduit 268 before being selectively distributed into the separation gas inlet conduit 212 and the barrier gas inlet conduit 216. In one embodiment, a separation gas control valve 270 diverts a portion of the gas from the conduit 268 into the separation gas inlet conduit 212 in response to a separation gas valve control signal 271 provided by the seal monitoring and control system 248. Similarly, a barrier gas control valve 272 diverts a remaining portion of the gas from the conduit 268 into the barrier gas inlet conduit 216 in response to a barrier gas valve control signal 273.

Various sensors are disposed to provide measurement signals indicative of the pressure, flow rate, and phase of gas in each of the separation gas and barrier gas inlet conduits 212 and 216. More specifically, a separation gas flow sensor 274 provides a separation gas inlet flow signal 275, a separation gas phase sensor 276 provides a separation gas phase signal 277, and a separation gas inlet pressure sensor 278 provides a separation gas inlet pressure signal 279. Similarly, a barrier gas flow sensor 280 provides a barrier gas inlet flow signal 281, a barrier gas phase sensor 282 provides a barrier gas phase signal 283, and a barrier gas inlet pressure sensor 284 provides a barrier gas inlet pressure signal 285.

The various sensor and command signals associated with the barrier gas and separation gas supply system 254 are exchanged between the various sensors and actuators and the seal monitoring and control system 248 via a communication line 286, which is shown as a single, dotted line but which is intended to include any appropriate number of communication lines or communication channels enabling the exchange of information and command signals between a controller included within the seal monitoring and control system 248, for example, the logic controller 166 shown in FIG. 1, and the various sensors and control devices included within the barrier gas and separation gas supply system 254.

The supply and treatment system 200 further includes flow sensors measuring the flow rate of seal gases exiting the seal arrangement such as seal arrangement 100 of FIG. 1 of compressor 202 during operation. More specifically, a process and barrier gas leakage flow sensor 288 is disposed along the process and barrier gas outlet conduit 210 and measures, for example, in reference to the arrangement shown in FIG. 1, the flow rate of the mixture of process gas leaking past the first stage seal 110 and of barrier gas leaking past the secondary labyrinth seal 152. The process and barrier gas leakage flow sensor 288 provides a first stage seal leakage signal 289 to the seal monitoring and control system 248.

In a similar fashion, a barrier and separation gas leakage flow sensor 290 is disposed along the barrier and separation gas outlet conduit 214. The barrier and separation gas leakage flow sensor 290 provides a second stage seal leakage signal 291 indicative of the flow rate of gas leaking past the second stage seal 111 and the separation seal 144 to the seal monitoring and control system 248. Finally, an optional bearing cavity leakage flow sensor 292 provides a bearing cavity gas leakage signal 293 indicative of the flow rate of barrier gas leaking into the bearing cavity 108 (FIG. 1) past the separation seal 144 (FIG. 1), which exits the compressor 202 via the optional separation gas outlet conduit 218. As with the other leakage signals, the bearing cavity gas leakage signal 293 is provided to the seal monitoring and control system 248.

A block diagram of a system schematic for an illustrated installation of a system 300 of an overhung compressor is shown in FIG. 3. In the discussion relative to FIG. 3, components or systems that are the same or similar to components and systems previously described are denoted by the same reference numerals as previously used for simplicity. While specific sensors are illustrated and described in connection with FIG. 3, it is understood that alternative combinations of parameter monitoring could be employed. For example, as illustrated in FIG. 1, the seal arrangement could include gap sensors, such as the gap sensors 188 and 192 that provide first stage seal gap signal 190 and second stage seal gap signal 194.

As shown in FIG. 3, a prime mover 302 provides power to operate an overhung compressor 304 via drive shaft 306. The drive shaft 306 includes a first stage seal 308 and a secondary seal 310 in a tandem configuration. Each of the first stage and secondary seals 308 and 310 is a dry gas seal and is essentially associated with sensors providing signals indicative of the gas or seal temperature, the presence of liquid in the gas stream provided to each seal, and of the position between sealing elements and the rotor and stator. More specifically, the first stage seal 308 includes a temperature sensor 312 providing a first stage seal temperature signal 313 and a first stage seal phase sensor 314 providing a first stage seal phase signal 315. The secondary seal 310 includes a temperature sensor 318 providing a secondary seal temperature signal 319, a secondary seal phase sensor 320 providing a secondary seal phase signal 321, and a secondary seal position sensor 322 providing a secondary seal position signal 323.

The various sensor signals from the first stage and secondary seals 308 and 310 are provided to a programmable logic controller 324 via appropriate signal communication lines. Such signal communication lines may be lines communicating analog and/or digital signals, and may include one or more electrical conduits relaying information in a single or multiple channels. In one embodiment, the signal communication lines may be channels belonging to a local area network (LAN) arrangement disposed to provide communication of signals and commands between the programmable logic controller 324 and other components, actuators, and/or systems.

In the illustrated embodiment, the programmable logic controller 324 is shown as a single component, but in alternate embodiments the logic functions provided by such a device may include more than one controller disposed to control various functions and/or features of a system. For example, a master controller, used to control the overall operation and function of the system, may be cooperatively implemented with secondary controllers dedicated to monitor and control separate sub-systems. In this embodiment, the term "controller" is meant to include one, two, or more controllers that may be associated with the system 300 and that may cooperate in controlling various functions and operations of the system

300. The functionality of the controller, while shown conceptually in FIG. 3 to include various discrete functions for illustrative purposes only, may be implemented in hardware and/or software without regard to the discrete functionality shown. Accordingly, various interfaces of the controller are described relative to components of the system 300 shown in the block diagram of FIG. 3. Such interfaces are not intended to limit the type and number of components that are connected, nor the number of controllers described.

In the embodiment illustrated in FIG. 3, the programmable logic controller 324 cooperates with a memory device 326 and with an output circuit driver 328. The memory device 326 may include areas of read-only memory (ROM), programmable read-only memory (PROM), random-access memory (RAM), and others, which can store operational programs, constants, service logs, and other parameters relevant to the operation of the programmable logic controller 324 and of the system 300. The output circuit driver 328 is a device that provides appropriate command signals to various actuators in the system 300, such as gas control valves, bypass valves, heaters, pressure intensifiers, and so forth. The output circuit driver 328 may include circuits that receive, transform, and/or interpret commands from the programmable logic controller 324 into command signals that are useable in effecting a change in the operating condition of a component. Accordingly, the output circuit driver 328 may include a power supply (not shown), rectifier circuits, inverter circuits, digital to analog converter circuits, and/or any other circuit that may be useful in controlling a system component based on a command from the programmable logic controller 324.

The system 300 includes two major functional centers for servicing the operation of the compressor 304. The first functional center is a gas treatment module 330, which is similar in certain respects to the process gas treatment module 224 shown in FIG. 2. The treatment module 300 includes various devices that condition and treat a flow of gas 332 that is provided to the first stage seal 308. The treatment module 330 of the illustrated embodiment includes a coalescor 334 operating in response to a coalescor signal 335 provided by the programmable logic controller 324 via the output circuit driver 328. The coalescor 334 may be any appropriate type of device that removes solid or liquid inclusions from a gas stream, for example, a filter, membrane, centrifugal separator, and so forth.

The gas treatment module 330 further includes a knockout filter or demister 336, which operates in response to a demister signal 337. The demister 336 may be any appropriate device capable of removing aerosol solutions or other types of moisture and/or vapors from a gas stream. A heater 338 operating to increase and/or decrease the temperature of the flow of gas 332 operates in response to a heater signal 339. The heater 338 may be any appropriate type of heat exchanger operating to impart or remove heat from the flow of gas 332 being treated. Finally, an intensifier 340 operating in response to an intensification signal 341 operates to adjust the pressure of the flow of gas 332. One can appreciate that other, additional, or fewer devices may be used within the treatment module 330 than the ones described relative to the illustrated embodiment.

A flow of treated first stage seal gas 342 exiting the treatment module 330 is provided to a gas control panel 344. A flow of secondary seal gas 346 may optionally provide sealing gas for the secondary seal 310. The gas control panel 344 may include various components and subsystems operating to regulate or otherwise control the flow of gas to the dry seals operating within the compressor 304 based on one or more operating parameters of the system 300. In the illustrated embodiment, the gas control panel 344 includes a first stage seal gas controller 348 that regulates the flow of first stage seal supply gas, and a secondary seal gas controller 352 regulating the flow of secondary seal supply gas. The first stage and secondary seal gas controllers 348 and 352 regulate their corresponding gas flows in response to, respectively, a first stage seal supply gas signal 349 and a secondary seal supply gas signal 353 provided by the programmable logic controller 324 via the output circuit driver 328. In one embodiment, each of the first stage and second stage seal gas controllers 348 and 352 includes a flow control device, such as the flow control device 242 shown in FIG. 2.

A resultant flow of first stage seal supply gas 350 and secondary seal supply gas 354 exit the gas control panel 344 and are provided to the first stage and secondary seals 308 and 310. The first stage and/or secondary seal gas signals 349 and 353 responsible for adjusting the resultant flows of first stage and secondary seal supply gas 350 and 354 are determined in the programmable logic controller 324 based on operational programs processed therein. Execution of such operational programs involves calculation of the flow rate and physical parameters of the first stage seal gas that will yield optimal operating conditions of the first stage seal 308, both in terms of sealing effectiveness as well as for seal longevity.

In one embodiment, the gas control panel further includes controllers operating to supply gas flows to other seals in the compressor 304 and/or monitor the operation of the various seals. Specifically, when the compressor 304 includes a barrier seal, for example, the barrier seal 144 shown in FIG. 1, the gas control panel 344 includes a barrier seal gas supply controller 356 operating to provide a flow of gas to the barrier seal, in this case, a portion of the flow of the secondary seal gas 346 entering the gas control panel 344, but other sources or types of gas may be used.

In the illustrated embodiment, the gas control panel further includes two seal monitors, a first stage seal monitor 358 and a secondary seal monitor 360. Each of the first stage and secondary seal monitors 358 and 360 is arranged to provide one or more outputs, for example, alarms, at increasing levels, when various faults or malfunctions are detected based on the various sensor signals provided to the programmable logic controller 324. In addition to the sensors already described, additional sensors may provide information to the programmable logic controller indicative of the operating state of the compressor 304 via a multi-channel communication line 362. In the illustrated embodiment, such additional plurality of sensors may include compressor speed, suction and discharge pressure, temperature of the process gas, axial vibration of the compressor, suction and discharge compressor flange radial vibration in each of two orthogonal directions, and, potentially, other sensors.

In general, various control algorithms operating within the programmable logic controller 324 are arranged to provide useful functionality that can warn an operator of potential anomalous operating conditions, alert the operator of fault conditions detected, as well as mitigate or address anomalous operating conditions occurring during operation of the compressor 304 such that the effects of a failure can be minimized or a failure may be averted without intervention by the operator. Various examples of such control algorithms are presented and various methods of operating and monitoring dry gas seals in a compressor are described below.

Figure 4:
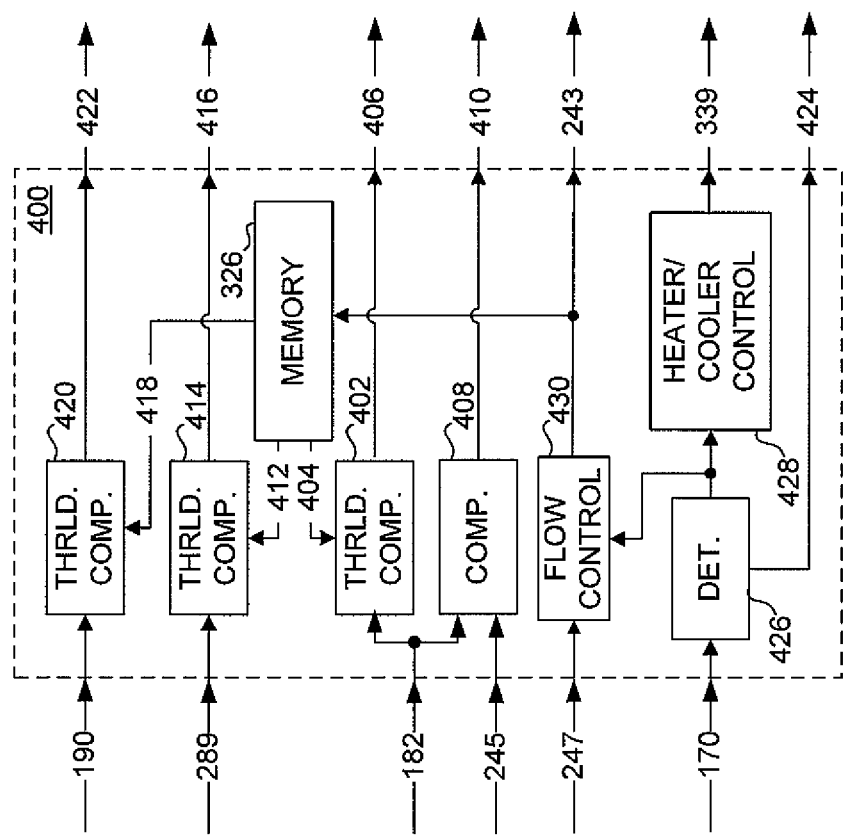
FIG. 4 is a block diagram for a monitoring and control algorithm in accordance with the disclosure.

A block diagram for a control algorithm 400 operating within the programmable logic controller 324 shown in FIG. 3 is presented in FIG. 4. The control algorithm 400 is arranged to monitor and adjust the operating parameters of the first stage and/or secondary seals 308 and 310 to ensure optimal operation and service life. One can appreciate that the control algorithm 400 can be applied with equal effectiveness to the tandem seal arrangement shown in FIG. 1 by appropriate integration thereof into the logic controller 166. In the description that follows, the control algorithm 400 is described specifically for functionality relative to the first stage seal 110 (shown as 308 in FIG. 3), but the same or similar algorithm would be applicable to the monitoring and control of the second stage seal 111 (shown as 310 in FIG. 3) or any seal used alone or in combination with other seals.

As shown in FIG. 4, the control algorithm 400 is disposed to receive various signals indicative of various operating parameters. With reference to FIG. 1, FIG. 2, and FIG. 3, the various signals generated by sensors in the tandem non-contacting dry gas seal arrangement 100 are provided to the control algorithm 400. Specifically, the first stage phase signal 170, the first stage seal temperature signal 182, and the first stage seal gap signal 190, are provided as inputs to the control algorithm 400. Other signals are further provided to the control algorithm 400 that are indicative of system operating parameters. In the illustrated embodiment, the sealing gas temperature 245, the sealing gas flow rate 247, and the first stage seal leakage signal 289 are provided as inputs. Different, additional, or fewer inputs than the ones described thus far may be provided to a control algorithm that is the same or similar to the control algorithm 400. During operation, the control algorithm 400 operates to provide one or more outputs, for example, generate alerts to an operator, in response to a determination of presence of an anomalous condition based on the provided signals. Moreover, the control algorithm 400 includes functionality to automatically mitigate the effects of a malfunction by adjusting various operating parameters of the system.

More specifically, the first stage seal temperature signal 182 is provided to a temperature threshold comparator 402, which is a function or other algorithm operating to compare the temperature of the first stage seal with a predetermined acceptable temperature range 404 provided by the memory device 326 (also shown in FIG. 3). When the first stage seal temperature signal 182 is determined to be outside of the range 404, an appropriate output is provided in response to such determination, in this case, an unexpected seal temperature alert 406 is activated. The unexpected seal temperature alert 406, when active, may include a change in a software variable indicating that a fault has occurred, and/or may alternatively trigger a visual and/or audible indication to an operator by way of flashing lights, sirens, and/or other perceptible signals intended to draw the operator's attention. Instances giving rise to activation of the unexpected seal temperature alert 406 include operating conditions when the temperature of the first stage seal 110 is above an expected value, indicating that the seal is undergoing heating due to friction or another cause, and also include conditions when the temperature of the first stage seal 110 is below an expected value, which may be an indication of excessive sealing gas leakage or any other cause. In one embodiment, an additional upper temperature threshold is used to generate a shutdown signal when the temperature of the first stage seal 110 is determined to be in excess of the upper temperature threshold, for example, 500 deg F. (260 deg C.).

In the illustrated embodiment, the first stage seal temperature signal 182 is further compared to the sealing gas temperature 245 in a temperature comparator 408. The temperature comparator 408 monitors the temperature of the first stage seal 110 relative to the temperature of the sealing gas being provided thereto to ensure that the two are within an acceptable range of each other after steady state operation has been established. A temperature warning 410 is activated to indicate that an unexpected change has been detected when the temperature of the first stage seal 110 is determined to diverge from the temperature of the sealing gas beyond a certain extent. The temperature warning 410 is generally an output signal provided in response to detection of an abnormal condition.

The memory device 326 also provides expected or acceptable threshold ranges to comparators monitoring the first stage seal gap signal 190 and the first stage seal leakage signal 289. Specifically, the first stage seal leakage signal 289 is compared to a leakage threshold range 412 in a leakage comparator 414. When the leakage is determined to be outside of the leakage threshold range 412, indicating that the flow of gas in the sealing and barrier gas outlet conduit 210 (FIG. 2) is below or above the expected range, a leakage warning or alert 416 is activated to inform the operator of the anomalous operating condition. In a similar manner, the first stage seal gap signal 190 is compared to a gap threshold range 418 in a gap threshold comparator 420, which activates a seal gap alert 422 to indicate that the seal is operating outside of expected operating conditions.

One can appreciate that the various threshold ranges provided by the memory device are parameters that can be predetermined and preprogrammed into the memory device 326. In one embodiment, the various threshold ranges are not constants, but are variable values that are determined based on other operating parameters of a system, such as compressor speed, process gas composition, flow rate, and so forth. Accordingly, the gap threshold range 418 may be set to zero when the rotational speed of the compressor (not shown) is low or zero, and may be adjusted accordingly based on the compressor speed, the density of the process gas, the temperature of the process gas, and/or other parameters during operation.

The control algorithm 400 is further disposed to activate a warning or alarm 424 when the presence of solids or liquids is indicated by way of the first phase signal 170. As discussed above, the first phase signal 170 is a signal indicative of the presence of matter in a non-gaseous phase within the stream of sealing gas in or around the first stage seal 110. Even though various filters and other devices are disposed to remove liquids and/or solids from the sealing gas flow, for example, the coalescing filter 234 shown in FIG. 2, or the coalescor 334 and demister 336 shown in FIG. 3, there exist operating conditions that may yield liquid and/or solid condensates within the sealing gas flow. Accordingly, a phase determinator 426 is disposed to monitor the first phase signal 170 and activate the alarm 424 when a non gaseous phase is detected.

The control algorithm 400 further includes functionality to mitigate effects of anomalous operating conditions. One example of such mitigation functionality is provided for conditions when liquid or solid condensates are detected in a sealing gas flow. The mitigation is a process of steps automatically followed by the control algorithm 400 that are known to rectify the anomalous condition by removing the condensates. In one embodiment, activation of the alarm 424 causes a change in a heater/cooler control module 428, which adjusts the heater signal 339 provided to the heater 338 as shown in FIG. 3. In the case when liquids are detected, for example, such adjustment may be arranged to cause the heater 338 to increase the temperature of the treated first stage seal gas 342 such that any liquid condensates can evaporate or any solid condensates can sublime into the gaseous phase. Such increase of gas temperature may continue incrementally until a maximum allowed temperature increase has been instructed or until the first phase signal 170 indicates that the liquids or solids have been removed. In specific instances, for example, in the case when the control algorithm 400 is applied to the second stage seal 111, and additional mitigation step may be performed. Such additional mitigation step includes instructing a flow control module 430 providing the flow control signal 243 to the flow control device 242, as shown in FIG. 2, to increase to the rate of flow of sealing gas to the first stage seal 110. Such adjustment may occur in addition to the temperature increase of the sealing gas provided to the first stage seal.

The control algorithm 400 is one example of the various algorithms that may be executed within the programmable logic controller 324. The control algorithm 400 and other algorithms is capable of storing and retrieving information, calculating various parameters, estimating the rate of change of parameters, and performing mathematical calculations when determining appropriate adjustments to control signals provided to the various components of the system. In the flowcharts that follow, various functionalities of the programmable logic controller 324 and associated components are described. The methodologies for controlling a compressor described below are intended to be implemented via appropriate control algorithms operating within logic controllers.

Figure 5:
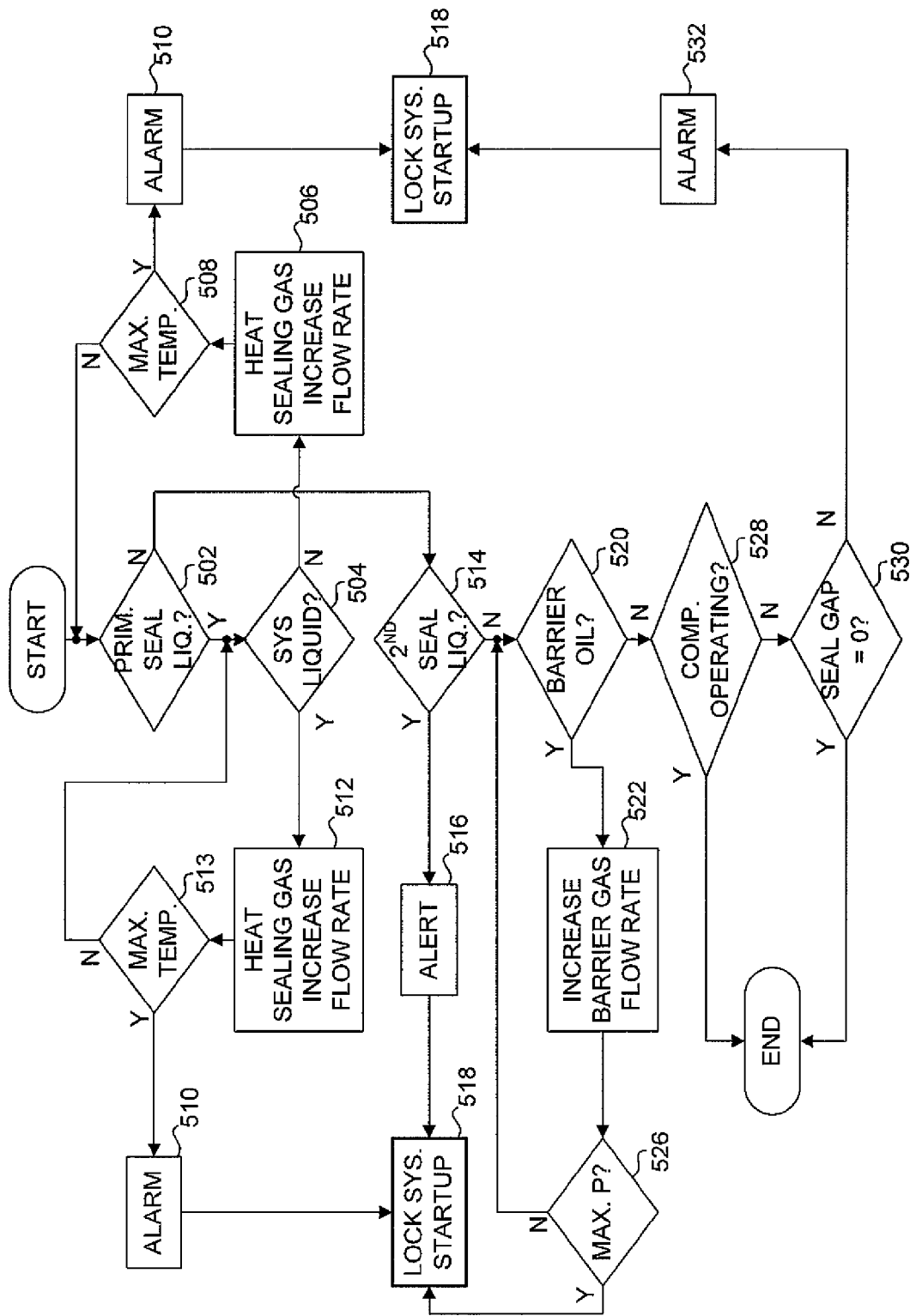
FIG. 5 is a flowchart for a method of detecting an anomalous static condition of a seal in accordance with the disclosure.

A flowchart for determining whether to prevent the initiation of operation of a compressor based on parameters provided from various sensors associated with a system connected to the compressor, especially regarding the state of the various compressor seals associated with the compressor, is shown in FIG. 5. In accordance with the method, a control system performs various checks before enabling operation of a compressor or the system. Accordingly, a determination at 502 is performed to determine whether liquid is present at the first stage seal, for example, by interrogating the first phase signal 170 (FIG. 1). When liquid is present, a second interrogation occurs at 504 of whether liquid is present in the supply system for process gas flow to the primary seal, for example, as indicated by the process gas phase signal 239. The control system may incrementally heat the process gas supply temperature and incrementally increase the flow rate at 506 when no liquid is present at the seal but no liquid is detected in the supply system until a maximum temperature is reached at 508, at which point an output is provided, for example, an alarm is sounded at 510, or until the liquid is no longer present. When liquid is also present in the supply system at 504, a similar intervention of increasing flow and temperature of the process gas occurs at 512, which continues until liquid is no longer present in the supply system, under the presumption that liquid in the first stage seal was liquid carried to the first stage seal from the supply system, or until the maximum temperature of process gas is reached at 513. Under such circumstances, the alarm or another output signal is activated at 510 and the system startup is locked.

The method further includes a determination of whether liquid is present at the second stage seal, for example, by interrogating the second phase signal 174 (FIG. 1) and the barrier gas phase signal 277 (FIG. 2) at 514. When it is determined that liquid is present, an alert is activated at 516 and system startup is locked at 518. In a similar fashion, the method ensures that no oil has intruded past the separation seal 144 (FIG. 1) and entered the third passage 160 (FIG. 1). Accordingly, the third phase signal 178 (FIG. 1) is interrogated at 520 and the separation gas flow is increased in the separation gas inlet conduit 216 (FIG. 2) by, for example, commanding an additional opening of the separation gas control valve 272 (FIG. 2), at 522, when it is determined that liquid is present. Such increase of separation gas flow continues to incrementally augment flow as long as liquid is still present at the separation gas outlet passage 158 (FIG. 1) or until the separation gas pressure has reached a maximum value, at 526, as indicated, for example, by the separation gas inlet pressure signal 285 (FIG. 2). Should the presence of liquid persist when the maximum pressure has been reached at 526, the startup of the system is locked at 518.

The method further includes a determination of the mechanical condition of the first and second stage seals 110 and 111 (FIG. 1) prior to startup. As discussed above, the primary and mating rings of both seals are expected to be in contact when no sealing gas flow is provided and when the compressor is not operating. An indication of compressor operation is considered at 528, for example, by determining whether the shaft speed of the compressor is zero and/or by comparing the inlet and outlet pressures of the compressor and expecting them to be equal. When the compressor is not yet operating, the gap or distance between each seal is interrogated at 530, and an alarm is activated at 532 if at least one gap is found to be non-zero. In one embodiment, the gap signals indicative of contact between the primary and mating rings in the first and second stage seals 110 and 111 (FIG. 1) are provided by, respectively, the first stage seal gap signal 190 and the second stage seal gap signal 194. In one embodiment, activation of the alarm at 532 indicating that a mechanical malfunction may be present in the seals causes the startup of the system to be locked at 518.

Figure 6:
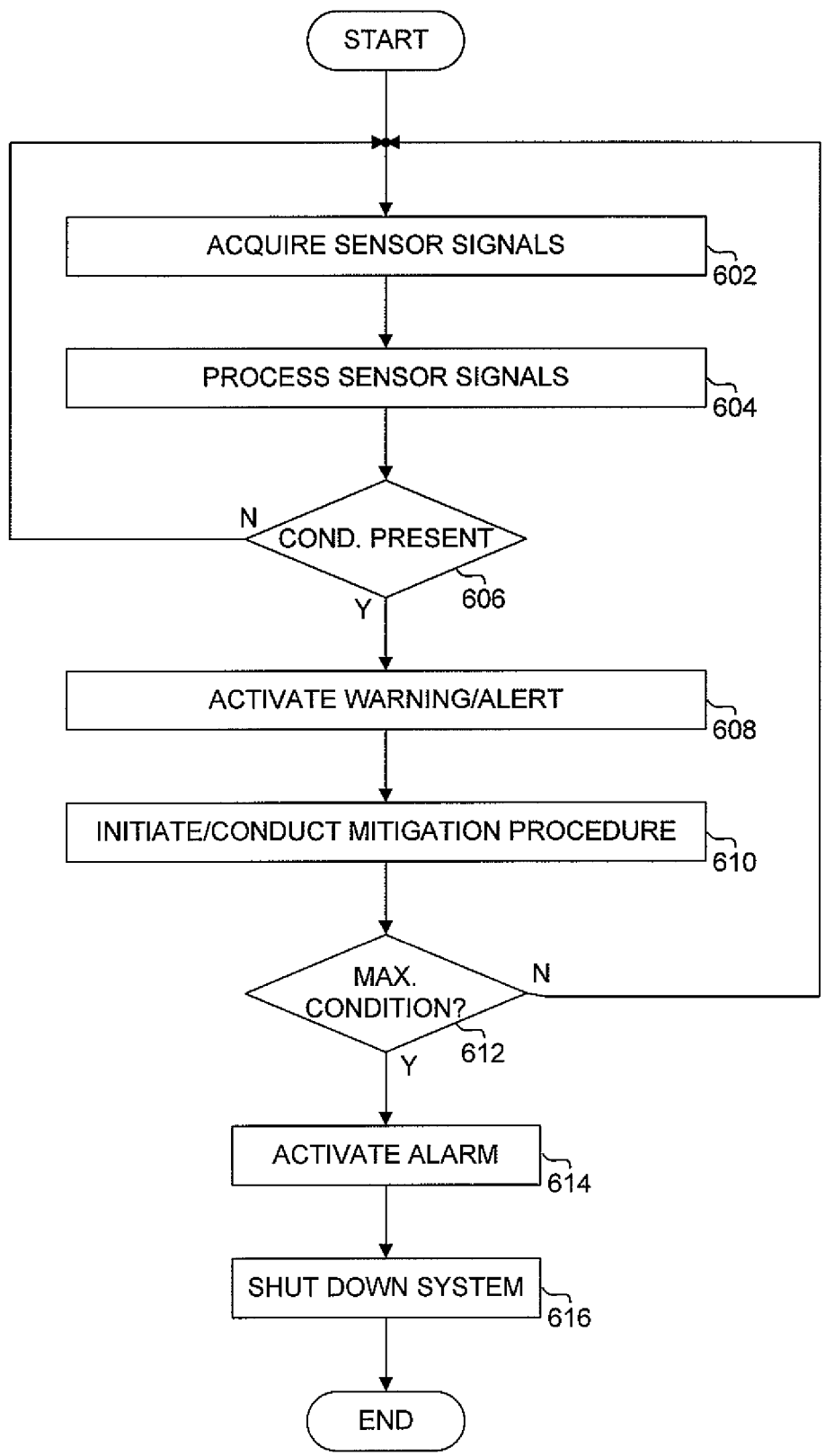
FIG. 6 is a flowchart for a method of determining the presence and mitigating the effects of an anomalous operating condition in accordance with the disclosure.

In addition to performing various checks before a compressor is placed in service, the programmable logic controller 324 (FIG. 3) is further capable of monitoring for anomalous operating conditions of the seal, mitigating or correcting anomalous operating conditions as they occur and while the compressor is in service, activating alerts and/or warnings and/or other output signals when fault conditions are present that cannot be mitigated, and even causing the system to shut down when conditions warrant such action. A flowchart for a method of monitoring and controlling the function of dry gas seals in a compressor during a dynamic operating condition is shown in FIG. 6. As shown in the flowchart, the method includes monitoring various operating parameters of the seals and of the seal gas supply system at 602. In one embodiment, such monitoring includes the interrogation of various sensor signals provided to the programmable logic controller 324 (FIG. 3), and the subsequent comparison of each signal with a corresponding acceptable range and/or maximum permitted value.

More specifically, the programmable logic controller 324 is disposed to receive various parameters indicative of the conditions of operation of the first stage seal 110 and the second stage seal 111 (FIG. 1), which include signals such as the first stage phase signal 170, the first stage seal temperature signal 182, the second stage phase signal 174, the second stage temperature signal 186, the third phase signal 178, and others. Each of these signals may be compared with a corresponding and predetermined range of acceptable values, and may be further compared to a corresponding maximum allowable value. Additionally, the programmable logic controller 324 is disposed to receive signals indicative of various operating parameters of a gas supply system for the dry gas seals operating within a compressor. Such signals may include, as shown in FIG. 2, the pressure signal 231, the temperature signal 233, the pressure difference signal 237, the process gas phase signal 239, the sealing gas temperature 245, the sealing gas flow rate 247, the barrier gas inlet flow signal 275, the barrier gas phase signal 277, the barrier gas inlet pressure signal 279, the separation gas inlet flow signal 281, the separation gas phase signal 283, the separation gas inlet pressure signal 285, and others.

These and other signals are monitored at 602 continuously during operation of the compressor. The various sensor signals are processed at 604 to determine whether indications exist for an anomalous operating condition. Such processing of sensor signals may include comparisons of each sensor signal with a corresponding acceptable or expected range of operation, and may further include a comparison of each sensor signal with a maximum allowable value. For example, one of the sensor signals monitored may be a seal temperature, such as the first stage seal temperature signal 182 (FIG. 1), and compared with an acceptable temperature range to determine whether the temperature of the first stage seal 110 (FIG. 1) falls within the acceptable range and whether it exceeds a maximum allowable range.

A determination at 606 is made whether one or more indications of a malfunction or of an anomalous operating condition is/are present. Such determination causes a notification of the condition to the operator or another output signal to be provided at 608, for example, by activation of an alarm or warning, and in one embodiment further causes the initiation of a mitigation procedure aimed at correcting the anomaly at 610, when a condition is present. For example, one type of anomalous operating condition that may be determined to exist is a flooding in the process that causes fluids to be carried into the first stage and the second stage seals.

The determination of when such condition is present, especially in the case when the seals are operating below the evaporation temperature of such liquid, can be made by the evaluation of various sensor signals. In this instance, for example, the primary seal temperature may be below its nominal operating level, the first stage phase sensor may indicate the presence of liquid, the second stage seal temperature may be above its nominal level, and the second stage seal phase sensor may indicate the presence of liquid. To mitigate such condition, the control system may increase the gas flow through the first and second seals, to flush out the liquid, and increase the temperature of the treated process gas provided to the first seal, to aid in evaporating any remaining liquid.

Various methods of performing the failure mitigation actions may be employed. In one exemplary embodiment, the control system may perform adjustments to the flow rates and temperatures of the various gases provided to the seals by commanding a series of incremental changes to such parameters to various components responsible for adjusting such parameters. For instance, in the example described above, an increase in the temperature of the treated process gas may be performed according to the following algorithm:

$$P009(i+1)=P009(i)+dT$$

where "P009" is a variable indicative of a commanded temperature of the process gas, such as the temperature change command signal 241 (FIG. 2), P009($i$) is a temperature command at a given time, P009($i$+1) is the temperature command after a process time or cycle time interval, which depends on an execution rate of the control system, and "dT" is a temperature increment value. One can appreciate that the above equation will cause step increases to the temperature of the process gas with each execution cycle. Such increase may continue provided the temperature of the gas remains below the maximum allowable temperature.

For further illustration of the above-mentioned example, the flow rate of the gases supplied to the first and second stage seals may be governed by the following algorithm:

$$P113/115(i+1)=P113/115(i)+dQ$$

where "P113/115" is a ratio of the gas flow rate provided to the first stage seal over the gas flow rate provided to the second stage seal, such as the ratio of the flow control signal 243 (FIG. 2) over the barrier gas valve control signal 271, the ratio being adjusted to provide a uniform pressure difference across the seals, ($i$+1) and ($i$) indicating two consecutive flow commands, and "dQ" is a flow-ratio increment value.

If the mitigation at 610 is not accomplished before one or more parameters reaches a maximum permitted value is reached at 612, the control system may activate an additional alarm at 614 and shut-down the system at 616 to avoid damage to the equipment. As previously described, such monitoring and control of the operation of dry gas seals in a compressor can be effective in automatically correcting anomalous conditions that may lead to the malfunction and reduction in the service life of various seals, by adjusting operating values in the system. Consistent with the exemplary mitigation procedure discussed above, the control system is capable of determining the presence of many other conditions requiring mitigation, and adjusting other operating parameters.

A collection of various anomalous operating conditions requiring action by the control system is presented in Table 1 below, along with the corresponding actions that may be taken by the control system to rectify such conditions. In the table, the anomalous conditions appear in numbered rows 1-18 as combinations of six sensor inputs appearing under the header "Sensor Signal Information." The mitigating action for each condition appears as a combination of actions under the heading "Control System Action." In the exemplary collection of data in the table, "F.S. HOT" is indicative of the temperature of the first stage seal exceeding a nominal operating temperature, "F.S. LIQ." equal to 1 indicates the presence of liquid at the first stage seal, "S.S. HOT" indicates a heated condition of the second stage seal, and "S.S. LIQ." indicates the presence of liquid at the second seal. Similarly, "SYS LIQ." indicates the presence of liquid in the treatment system for the process gas at a location downstream of the knockout filters, and "VENT OIL" indicates the presence of oil from the bearing cavity invading the seals.

An exemplary collection of mitigating acts are also presented in the table, where "F.S. GAS INCR." indicates an increase in the flow rate of gas provided to the first stage seal, "S.S. GAS INCR" indicates an increase in the flow rate of gas provided to the second stage seal, "GAS RATIO INCR." indicates an increase in the ratio of flow rates of gases to the first and second stage seals, "SEPARATION GAS INCR." indicates an increase in the flow rate of gas provided to the separation seal (for example, the separation seal 144 shown in FIG. 1), and "TEMP. INCR." indicates a temperature increase of process gas provided to the first stage seal. Such flow rate or temperature increases may be performed by gradual or incremental increases as described in the example above, or may be performed by any other suitable fashion, for example, ramp or linear changes, changes following a functional relationship, and so forth. Table 1 is presented below:

TABLE 1

| | Sensor Signal Information | | | | | | Control System Action | | | | |
|---|---|---|---|---|---|---|---|---|---|---|---|
| # | F.S. HOT | F.S. LIQ. | S.S. HOT | S.S. LIQ. | SYS. LIQ. | VENT OIL | F.S. GAS INCR. | S.S. GAS INCR | GAS RATIO INCR. | SEPARATION GAS INCR. | TEMP. INCR. |
| 1 | YES | 1 | YES | 1 | 0 | 0 | — | — | YES | — | YES |
| 2 | YES | 1 | NO | 0 | 0 | 0 | YES | — | — | — | YES |
| 3 | YES | 1 | YES | 1 | 1 | 0 | — | YES | — | — | YES |
| 4 | YES | 1 | NO | 0 | 1 | 0 | — | YES | — | — | YES |
| 5 | YES | 0 | YES | 1 | 0 | 0 | — | — | YES | — | YES |
| 6 | YES | 0 | NO | 0 | 0 | 0 | — | — | YES | — | YES |
| 7 | NO | 1 | YES | 1 | 0 | 0 | — | — | YES | — | YES |
| 8 | NO | 1 | NO | 0 | 0 | 0 | YES | — | — | — | YES |
| 9 | NO | 1 | YES | 1 | 1 | 0 | — | YES | — | — | YES |
| 10 | NO | 1 | NO | 0 | 1 | 0 | — | YES | — | — | YES |
| 11 | NO | 0 | YES | 1 | 0 | 0 | — | — | YES | — | YES |
| 12 | NO | 0 | NO | 0 | 1 | 1 | — | YES | — | YES | — |
| 13 | YES | 1 | YES | 1 | 0 | 1 | — | — | YES | YES | YES |
| 14 | YES | 1 | YES | 1 | 1 | 1 | — | YES | — | YES | YES |
| 15 | YES | 0 | YES | 1 | 0 | 1 | — | — | YES | YES | YES |
| 16 | YES | 1 | YES | 1 | 0 | 0 | — | — | YES | YES | YES |
| 17 | YES | 1 | YES | 1 | 1 | 0 | — | YES | — | — | YES |
| 18 | YES | 0 | YES | 1 | 0 | 0 | — | — | YES | YES | YES |

As can be seen from the above table, various mitigation measures may be taken. The example involving the presence of liquid in the first and second seals discussed above corresponds to row #1 of the table.

The measures shown and described relative to Table 1 may be implemented for each of multiple seals or sets of seals used in a compressor system. In one embodiment, each of the first and second seals disposed in the discharge side of a compressor may be monitored and controlled according to the above table, and a second set of a first and second seal disposed at the suction end of a compressor may be controlled by a similar, corresponding table within the control system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A seal monitoring system for a gas lubricated non-contacting seal disposed in sealing relationship between a rotatable shaft and a housing of a compressor, said seal having a surrounding seal chamber, said system comprising:
   a phase sensor disposed to provide a phase signal indicative of non-gaseous matter adjacent to said gas lubricated non-contacting seal; and
   a programmable logic control system disposed to receive said phase signal, wherein said programmable logic control system is further disposed to determine an operating condition of said gas lubricated non-contacting seal based on said phase signal and prove an output signal in response to said operating condition;
   wherein the programmable logic controller is further disposed to determine a presence of an anomalous operating condition based on said operating condition, and perform at least one mitigating process to correct said anomalous operating condition by adjusting at least one operating parameter of said gas lubricated non-contacting seal;
   a process gas treatment module arranged to provide a flow of process gas to said gas lubricated non-contacting seal via a process gas inlet passage formed in the housing of the compressor, said process gas treatment module including:
   a process gas conduit adapted to provide said flow of process gas from an upstream end to a downstream end thereof;

at least one coalescing filter fluidly intersecting said process gas conduit;
a differential pressure sensor disposed across said at least one coalescing filter along said process gas conduit and providing a process gas differential pressure signal;
a process gas phase sensor disposed to provide a process gas phase signal indicative of non-gaseous matter in said process gas conduit downstream of said at least one coalescing filter;
a process gas temperature sensor disposed to provide a process gas temperature signal;
a process gas flow sensor disposed to provide a process gas flow signal indicative of a flow rate of said flow of process gas downstream of said at least one coalescing filter;
wherein said programmable logic control system is further disposed to perform said at least one mitigating process based on at least one of said process gas differential pressure signal, process gas phase signal, process gas temperature signal, and process gas flow signal.

2. The seal monitoring system of claim 1, wherein said process gas treatment module further comprises:
a heater/cooler device disposed along said process gas conduit and disposed to adjust a process gas temperature in response to a temperature change command signal provided by said programmable logic control system; and
a flow control device disposed along said process gas conduit and disposed to adjust a rate of flow of said flow of process gas in response to a flow control signal provided by said programmable logic control system;
wherein at least one of said temperature change command signal and said flow control signal is provided as part of said at least one mitigating process of said programmable logic control system.

3. A seal monitoring system for a gas lubricated non-contacting seal comprising a first gas lubricated non-contacting seal disposed in sealing relationship between a rotatable shaft and a housing of a compressor, and
a second gas lubricated non-contacting seal disposed in tandem arrangement relative to said first gas lubricated non-contacting seal between said rotatable shaft and said housing of said compressor; said system comprising:
a first phase sensor disposed to provide a first phase signal indicative of non-gaseous matter adjacent to said first gas lubricated non-contacting seal;
a first temperature sensor disposed to provide a first temperature signal of a temperature of a component of said first gas lubricated non-contacting seal;
a first gap sensor disposed to provide a first gap signal indicative of a distance between a primary ring and a mating ring of said first gas lubricated non-contacting seal;
a programmable logic control system disposed to receive said first phase signal, said first temperature signal and first gap signal wherein said programmable logic control system is further disposed to determine an operating condition of said first gas lubricated non-contacting seal based on any one of said signals and provide an output signal in response to said operating condition; and
wherein said second gas lubricated non-contacting seal is associated with:
a second temperature sensor disposed to provide a second temperature signal indicative of a temperature of an additional component of said second gas lubricated non-contacting seal,
a second gap sensor disposed to provide a second gap signal indicative of a distance between a second primary ring and a second mating ring of said second gas lubricated non-contacting seal, and
an additional phase sensor disposed to provide an additional phase signal indicative of non-gaseous matter adjacent to said second gas lubricated non-contacting seal;
wherein said programmable logic control system is further disposed to receive said second temperature, second gap and additional phase signals, and
wherein said programmable logic control system is further disposed to determine an operating condition of said second gas-lubricated non-contacting seal based on any one of said second signals and provide an output signal is response to said operating condition.

4. The seal monitoring system of claim 3, further comprising a secondary gas supply system adapted to provide a flow of separation gas to said second gas lubricated non-contacting seal and including:
a separation gas control valve disposed to adjust a flow rate of said flow of separation gas in response to a separation gas valve control signal provided by said programmable logic control system;
a separation gas flow sensor disposed to provide a separation gas flow signal to said programmable logic control system;
a separation gas phase sensor disposed to provide a separation gas phase signal to said programmable logic control system; and
a separation gas inlet pressure sensor disposed to provide a separation gas inlet pressure signal to said programmable logic control system;
wherein said determination of said operating condition is further based on at least one of said separation gas flow signal, separation gas phase signal, and inlet pressure signals, and
wherein said at least one mitigating process further includes providing an adjusted separation gas valve control signal.

5. A supply system for providing a flow of treated gas to a gas lubricated non-contacting seal disposed within a compressor, comprising:
a control system;
a first plurality of sensors disposed to measure seal operating parameters and provide a first plurality of signals indicative of said seal operating parameters to said control system;
a second plurality of sensors disposed to measure supply system operating parameters and provide a second plurality of signals indicative of said supply system operating parameters relative to said flow of treated gas to said control system;
a third plurality of sensors disposed to measure compressor operating parameters and provide a third plurality of signals indicative of said compressor operating parameters to said control system;
wherein said control system is disposed to:
determine an operating condition of said gas lubricated non-contacting seal based on said first, second, and third pluralities of signals; and provide an output in response to said operating condition.

6. The supply system of claim 5, wherein said control system is further disposed to determine said operating condition as being an anomalous operating condition, and to automatically perform at least one mitigating process to correct said anomalous operating condition by adjusting at least one physical property parameter of said flow of treated gas.

7. The supply system of claim 6, wherein said anomalous operating condition includes at least one of overheating of said gas lubricated non-contacting seal, and a presence of a liquid state of matter in said flow of treated gas.

8. The supply system of claim 6, wherein said at least one mitigating process includes selectively increasing a rate of said flow of treated gas incrementally while said anomalous operating condition is present and until a flow limit is reached.

9. The supply system of claim 6, wherein said at least one mitigating process includes selectively increasing a temperature of said flow of treated gas incrementally while said anomalous operating condition is present and until a temperature limit is reached.

10. The supply system of claim 5, wherein said first plurality of sensors includes at least one of a phase sensor disposed to provide a phase signal indicative of a presence of non-gaseous matter adjacent to said gas lubricated non-contacting seal, a temperature sensor disposed to provide a signal indicative of a temperature of a component of said gas lubricated non-contacting seal, a gap sensor disposed to provide a gap signal indicative of a distance between a primary ring and a mating ring of said gas lubricated non-contacting seal, and a position sensor disposed to provide an axial distance signal indicative of an axial distance between rotatable and stationary components of said compressor.

11. The supply system of claim 5, wherein said second plurality of sensors is associated with at least one of a gas treatment module and a gas control panel and includes at least one of a pressure sensor disposed to provide a pressure signal indicative of a pressure of said flow of treated gas, a temperature sensor disposed to provide a temperature signal indicative of a temperature of said flow of treated gas, a differential pressure sensor disposed to provide a differential pressure signal indicative of a state of a filter disposed to filter said flow of treated gas, a phase sensor disposed to provide a signal indicative of a presence of non-gaseous matter in said flow of treated gas, and a flow sensor disposed to provide a signal indicative of a rate of flow of said flow of treated gas.

12. The supply system of claim 5, wherein said third plurality of sensors includes at least one of a speed sensor disposed to provide a rate of rotation signal indicative of a speed of the compressor, a suction pressure sensor disposed to measure a process gas pressure at a suction side of the compressor, a discharge pressure sensor disposed to provide a process gas pressure at a discharge side of the compressor, a suction side vibration sensor disposed to measure a vibration at a suction flange of the compressor, and a discharge side vibration sensor disposed to measure a vibration at a discharge flange of the compressor.

13. The supply system of claim 5, wherein the control system is further disposed to:
    determine a static condition of said gas lubricated non-contacting seal based on said first and second pluralities of signals prior to operation of said compressor;
    lock startup of said compressor when said static condition is an anomalous stating condition; and
    provide an output signal in response to said static condition.

14. The supply system of claim 13, wherein determination of said static condition is based on a comparison of an axial distance measured between rotatable and stationary components of said compressor with a threshold value.

15. The supply system of claim 13, wherein determination of said static condition is based on a gap signal provided by a gap sensor disposed to measure a distance between a primary ring and a mating ring of the gas lubricated non-contacting seal.

16. The supply system of claim 5, wherein said control system is further disposed to provide a visual representation of said operating condition.

17. A seal monitoring system for a gas lubricated non-contacting seal disposed in sealing relationship between a rotatable shaft and a housing of a compressor, comprising:
    a position sensor disposed to provide a position signal indicative of a relative axial position of rotatable components and stationary components of the gas lubricated non-contacting seal;
    a programmable logic control system disposed to receive said position signal, wherein said programmable logic control system is further disposed to determine an operating condition of said gas lubricated non-contacting seal based on said position signal and provide an output signal in response to said operating condition;
    a second gas lubricated non-contacting seal disposed in tandem arrangement relative to said gas lubricated non-contacting seal between said rotatable shaft and said housing of said compressor;
    wherein said second gas lubricated non-contacting seal is associated with:
        a temperature sensor disposed to provide a temperature signal indicative of a temperature of an additional component of said second gas lubricated non-contacting seal,
        a gap sensor disposed to provide a gap signal indicative of a distance between a second primary ring and a second mating ring of said second gas lubricated non-contacting seal, and
        a phase sensor disposed to provide a phase signal indicative of nongaseous matter adjacent to said second gas lubricated non-contacting seal;
    wherein said programmable logic control system is further disposed to receive said temperature, gap, and phase signals, and
    wherein said programmable logic control system is further disposed to determine said operating condition based on at least one of said temperature, gap, and phase signals.

18. A seal monitoring system for a gas lubricated non-contacting seal disposed in sealing relationship between a rotatable shaft and a housing of a compressor, said seal having a surrounding seal chamber, said system comprising:
    a phase sensor disposed to provide a phase signal indicative of non-gaseous matter in said seal chamber adjacent to said gas lubricated non-contacting seal; and
    a programmable logic control system disposed to receive said phase signal, wherein said programmable logic control system is further disposed to determine an operating condition of said gas lubricated non-contacting seal, based on said phase signal and provide an output signal in response to said operating condition;
    wherein said compressor further include a separation seal between said housing and rotatable shaft, and said phase sensor is disposed between said gas lubricating non-contacting seal and said separation seal.

19. The seal monitoring system of claim 18, wherein said phase sensor is an optical sensor that detects the presence of a solid or liquid aerosol solution in a gas stream based on properties of a light beam emitted and received by said sensor.

* * * * *